(12) United States Patent
Nishida

(10) Patent No.: US 6,831,792 B2
(45) Date of Patent: Dec. 14, 2004

(54) OBJECTIVE LENS, COMBINATION OF OBJECTIVE LENSES, AND METHOD FOR ADJUSTING OPTICAL SYSTEM USING OBJECTIVE LENS

(75) Inventor: Hiroyuki Nishida, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/389,879

(22) Filed: Mar. 18, 2003

(65) Prior Publication Data

US 2003/0179461 A1 Sep. 25, 2003

(30) Foreign Application Priority Data

Mar. 19, 2002 (JP) ........................................ 2002-076726

(51) Int. Cl.⁷ ............................................. G02B 21/02
(52) U.S. Cl. ....................................................... 359/656
(58) Field of Search ................................ 359/656–661, 359/397, 440, 441, 804, 801

(56) References Cited

U.S. PATENT DOCUMENTS 4,833,382 A * 5/1989 Gibbs ........................... 318/640
5,155,556 A * 10/1992 Foanio ......................... 356/397

OTHER PUBLICATIONS

Morgan, Joseph, Introduction to Geometrical and Physical Optics, McGraw–Hill 1953, pp. 132–133.*

* cited by examiner

Primary Examiner—Scott J. Sugarman
Assistant Examiner—Deborah A. Raizen
(74) Attorney, Agent, or Firm—Kenyon & Kenyon

(57) ABSTRACT

The reference objective lens includes an objective lens and an index member provided with an index that indicates a reference position. The index member is disposed on the front-side focal position of the objective lens or in its vicinity. Upon the reference objective lens thus configured being mounted on an apparatus having an image sensor, an image of the index that indicates a reference position is captured with the image sensor, and a position of the index in the captured image is calculated out and stored. Then, upon a predetermined optical system being mounted on the apparatus having the image sensor in place of the reference objective lens, aberrations of the optical system are measured, and the optical system is adjusted so that aberrations at a position that corresponds to the stored position satisfy a predetermined condition.

18 Claims, 4 Drawing Sheets

Fig. 3A    Fig. 3B    Fig. 3C
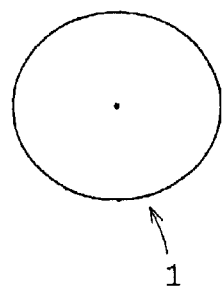 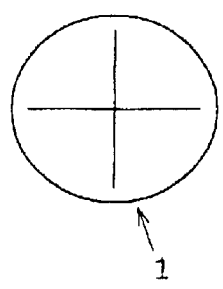 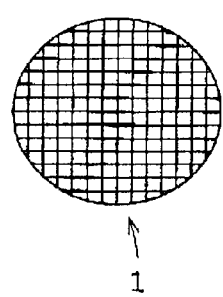
Fig. 4A    Fig. 4B
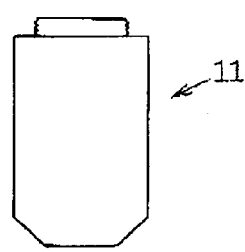 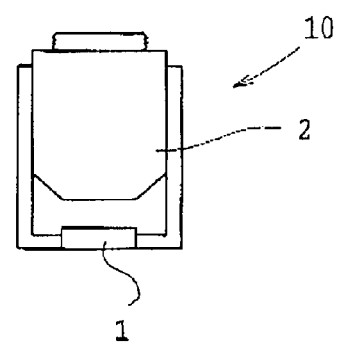

OBJECTIVE LENS, COMBINATION OF OBJECTIVE LENSES, AND METHOD FOR ADJUSTING OPTICAL SYSTEM USING OBJECTIVE LENS

BACKGROUND OF THE INVENTION

1) Field of the Invention

The present invention relates to an objective lens, a combination of objective lenses, and a method for adjusting an optical system using an objective lens.

2) Description of Related Art

In the case where none of lens elements constituting an optical system is decentered from a single axis, that is, in the case of an ideal optical system, a position at which aberrations are smallest exists on the axis. Also, in the case of the ideal optical system, the axial position coincides with the field center. Therefore, in the ideal optical system, observation and measurement of a minute specimen would better be performed at the field center.

In an actual optical system, however, each lens often is decentered subtletly or slightly. This is because the lenses and lens frames involve tolerance. As a result, in the actual optical system, perfect coincidence of the axial position with the field center seldom occurs.

Therefore, in the actual optical system, adjustment is made, during or after assemblage of the optical system, to minimize decentering of individual lenses. For example, one adjustment method in assembling an objective lens is to use a pinhole specimen. According to this method, adjustment is made so that images of pinholes have substantially the same shape over the entire field. Alternatively, upon the pinhole specimen being shifted back or forth in reference to the in-focus position to cause defocus condition, adjustment is made so that image blur of the pinholes is symmetrically formed.

However, according to the above-described adjustment method, the amount or the distribution pattern of aberrations is not measured. Therefore, even if aberrations of the entire lens system can be minimized, it is impossible to locate, in the field, a point at which aberrations are smallest. As a result, if a plurality of objective lenses of the same type and magnification are individually adjusted according to the above adjustment method, it would cause problems such that image appearance or measured values vary by individual objective lens.

Also, in the case of an optical system that is configured to perform observation or measurement via an imaging lens or a relay lens in addition to the objective lens, even if the axial position and the field center coincide in the objective lens, decentering of the imaging lens or the relay lens would shift the axial position and the field center from each other. As a result, in the optical system as a whole, the axial position and the field center do not coincide. To be worse, since the axial point cannot be located, it is impossible to make the axial position and the field center to coincide.

SUMMARY OF THE INVENTION

An object of the present invention is to provide an objective lens that allows a user to locate the axial point of an optical system in the field.

Another object of the present invention is to provide an objective lens that can adjust a predetermined optical system so that positions in the field at which a predetermined aberration condition is satisfied substantially coincide in the optical system, and a method for adjusting an optical system using this objective lens.

Still another object of the present invention is to provide a combination of objective lenses used for observation or measurement, the combination allowing a user to locate a point in the field at which a predetermined aberration condition is satisfied.

In order to attain the objects set forth above, an objective lens according to the present invention includes a lens system and an index member provided with an index that indicates a reference position, wherein the index member is disposed at the front-side focal position of the lens system or in the vicinity thereof.

Also, a combination of objective lenses according to the present invention at least includes a first objective lens and a second objective lens, wherein the first objective lens is composed of a lens system alone and the second objective lens has a lens system and an index member provided with an index that indicates a reference position. The index member is disposed on the front-side focal position of the lens system of the second objective lens or in the vicinity thereof. The first objective lens is adjusted so that aberrations at a position corresponding to the position of the index that indicates a reference position of the second objective lens satisfy a predetermined condition.

Also, according to the present invention, a method for adjusting an optical system using an objective lens includes a step of mounting on an apparatus provided with an image sensor an objective lens that has a lens system and an index member disposed at the front-side focal position of the lens system or in the vicinity thereof, the index member being provided with an index that indicates a reference position, and capturing an image of the index that indicates a reference position with the image sensor, a step of calculating the position of the index that indicates a reference position in the captured image and storing the position of the index, a step of mounting a predetermined optical system in place of the objective lens on the apparatus having the image sensor and measuring aberrations of the predetermined optical system, and a step of adjusting the optical system so that aberrations at a position that corresponds to the stored position satisfy a predetermined condition.

According to the present invention, in constructing or using an optical system that is required to have a measurement precision of the order of nanometers, a user can easily determine a certain point on the specimen surface that is functionally characterized in the optical system.

This and other objects as well as features and advantages of the present invention will become apparent from the following detailed description of the preferred embodiments when taken in conjunction with the accompanying drawings.

BRIEF DESCRIPTION OF THE DRAWINGS

FIG. 3A is one example of pattern of an index provided for an index member used in a reference objective lens according to the present invention.

FIG. 3B shows another example of pattern of the index provided for the index member used for the reference objective lens according to the present invention.

FIG. 3C shows still another example of pattern of the index provided for the index member used for the reference objective lens according to the present invention.

FIG. 4A shows an objective lens that is to be combined with a reference objective lens, for the purpose of explaining combination of objective lenses according to the second embodiment of the present invention. FIG. 4B shows the reference objective lens to be combined with the objective lens shown in FIG. 4A.

DETAILED DESCRIPTION

Figure 1A:
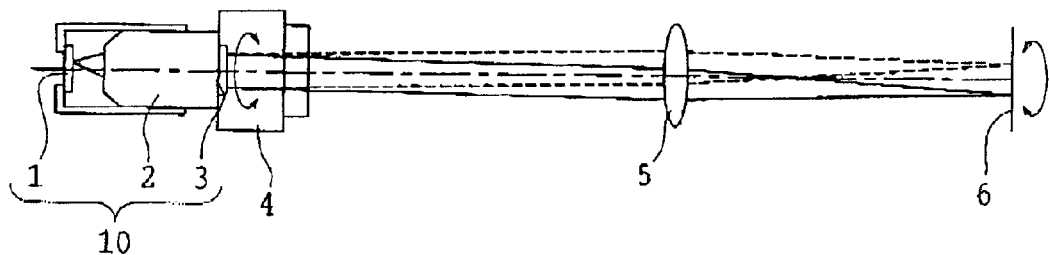
FIG. 1A is an explanatory view that shows a technique for adjusting a position of an index using a turn structure member in a reference objective lens of the present invention, illustrating a situation where light emanating from any point on the index member emerges not perpendicular to the mount level surface of the objective lens.

Preceding the explanation of the individual embodiments, the function and effect of the device according to the present invention is explained.

In the case of an infinite distance objective lens, the front-side focal point of the objective lens is positioned on the object surface (specimen surface). The objective lens of the present invention is provided with an index member integrally mounted thereon. The index member is provided with an index that indicates a reference position (hereafter, referred to as a reference index) and is disposed on the front-side focal position of the objective lens or in the vicinity thereof. Hereafter, this objective lens is referred to as a reference objective lens.

According to the present invention, it is desirable that the index member is fixed on the front-side focal position of the objective lens. However, as long as its position in the field can be determined, the index member may be fixed at a position somewhat displaced from the front-side focal position, or a position that causes image blur, for example, at a position where the focal depth is shifted by several times.

Also, according to the present invention, it is desirable that the reference index forms a pattern that functions as coordinates, to determine the position of a desired point in the field.

If a desired point in the field can be determined as the reference index, the reference position can be standardized more specifically.

Also, according to the present invention, the objective lens has a mount level surface, and the index member is desirably positioned so that a position on which a beam of parallel rays incident perpendicular to the mount level surface converges coincides with the position of the reference index in the field.

This configuration allows a laser to determine, upon the reference objective lens being mounted on a desired optical system, the position of the axial point in the field, in the optical system.

The reference index is desirably fixed at an optically significant point. The axial position is one of optically significant points. This is because aberrations are smallest at the axial position.

In the objective lens, if the reference position is set on the axis, a portion that can be a base to determine the reference position is the mount level surface. If an infinite distance objective lens is ideally constructed, a beam of parallel rays incident perpendicular to the mount level surface should converge on the field center on the specimen surface, and the field center should coincides with the axis of the objective lens. On the other hand, if the infinite distance objective lens is not ideally constructed, the point of light convergence does not necessarily coincide with the field center on the specimen surface. However, the position on which a beam of parallel rays incident perpendicular to the mount level surface converges can be considered to be on the axis. Therefore, by setting the position on which a beam of parallel rays converges as a reference, that is, the position of the reference index, a user can easily determine the axial position.

Alternatively, according to the present invention, the index member may be positioned so that, while the objective lens is turned around an axis perpendicular to the mount level surface, an image of the reference index formed via the objective lens constantly stays at the same position.

In order to position the index member by causing a beam of parallel rays to be incident perpendicular to the mount level surface, it is necessary to produce the beam of parallel rays and to detect whether the beam is perpendicularly incident. However, if the objective lens can be turned around an axis perpendicular to the mount level surface, positioning of the index member can be made more easily than the method using a beam of parallel rays perpendicularly incident.

Figure 1B:
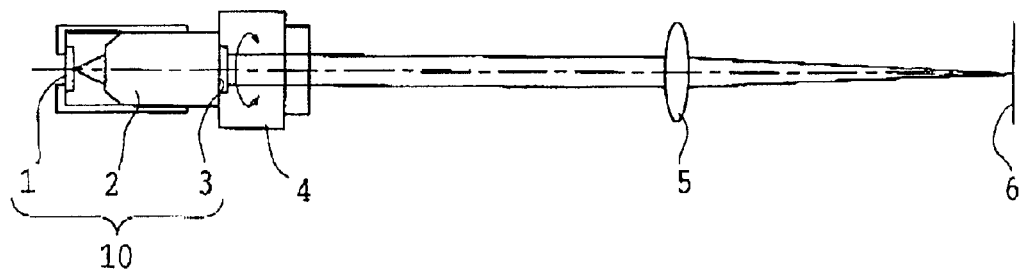
FIG. 1B is an explanatory view similar to FIG. 1A, illustrating a situation where light emanating from any point on the index member emerges perpendicular to the mount level surface of the objective lens.

FIGS. 1A–1B show the method for adjusting the position of the index using a turn member in the reference objective lens according to the present invention. In the drawings, the reference numeral 1 denotes an index member, the reference numeral 2 denotes an objective lens, the reference numeral 3 denotes a mount level surface, the reference numeral 4 denotes a turn member, the reference numeral 5 denotes an imaging lens, and the reference numeral 6 denotes an image surface.

FIG. 1A shows the situation where light emanating from a point on the index member 1 emerges not perpendicular to the mount level surface 3 of the objective lens 2. In this situation, when the objective lens 2 is turned around an axis that is perpendicular to the mount level surface 3 via the turn member 4, an image point draws a circle on the image surface 6. Here, if the position of the index is adjusted so that its conjugate image point on the image surface 6 does not draw a circle, the image of the reference index on the image surface 6 formed via the objective lens 2 constantly stays at the same position, as in the situation shown in FIG. 1B, for example. This is the very situation where light emerges perpendicular to the mount level surface 3 of the objective lens 2. It is not absolutely necessary that the emergent light is a beam of parallel rays, but it only requires that the light includes a component that forms a beam of parallel rays. Also, if the imaging lens 5 is decentered, the center of the drawn circle is displaced from the field center in the image surface 6. However, if turn of the objective lens 2 does not cause the image point to draw a circle, the situation is in that light is emergent from the mount level surface 3 perpendicularly.

Also, according to the present invention, it is preferred that the following condition (1) is satisfied:

$$\Delta X1/f \leq 0.001 \tag{1}$$

where $\Delta X1$ is a displacement between a position on which a beam of parallel rays incident perpendicular to the mount level surface converges and a position of the reference index, and f is a focal length of the lens system constituting the objective lens.

Alternatively, according to the present invention, it is preferred that the following condition (2) is satisfied:

$$\Delta X2/f \leq 0.001 \tag{2}$$

where $\Delta X2$ is a radius of a circle drawn by the reference index when the objective lens is turned around an axis perpendicular to the amount level surface, and f is a focal length of the lens system constituting the objective lens.

If a value of $\Delta X1$ or $\Delta X2$ is sufficiently small, the left side of Condition (1) or (2) directly presents by how much angle the light emanating from the reference point of the objective lens and emergent from the mount level surface is inclined in reference to a line perpendicular to the mount level surface. Therefore, a value of the left side closer to zero is preferred. However, if measurement of the order of nanometers is taken into consideration, it is sufficient that the left-side value of Condition (1) or (2) is equal to or smaller than the right-side value.

Also, performance of a predetermined optical system can be tuned using the above described reference objective lens. Specifically, as described above as a method according to the present invention, tuning is preferably carried out according to the following steps: mounting the reference objective lens on an apparatus provided with an image sensor, capturing an image of the reference index with the image sensor, calculating a position of the reference index in the captured image to store the position of the reference index, mounting a predetermined optical system (e.g. a normal objective lens having no index) in place of the reference objective lens on the apparatus having the image sensor, measuring aberrations of the optical system, and adjusting the optical system so that aberrations at a position that corresponds to the stored position calculated out on the basis of the measurement satisfy a predetermined condition.

The reference index in the reference objective lens would lose its significance if a predetermined aberration condition should not be satisfied at the point indicated by it. Here, a point at which the predetermined aberration condition is satisfied is defined as a point at which generation of aberrations is smallest or a symmetry center with respect to which aberrations are generated symmetrically. In the case of monochromatic light, the point at which generation of aberrations is smallest coincides with the symmetry center with respect to which aberrations are generated symmetrically. On the other hand, in then case of white light, displacement between these two points depends on the spectral balance or what kind of aberration that weighs.

The object of the present invention can be attained even by measuring, in compliance with the user's requirement, performance of the objective lens having already finished assemblage and adjustment, detecting a point at which a predetermined aberration condition is satisfied, and thereon superposing the reference index. However, this method requires a user to find out from the entire field a single point at which the predetermined aberration condition is satisfied, and thus involves great difficulty. In contrast, if, upon the position of the reference index being preliminarily fixed before assemblage and adjustment, the objective lens is adjusted so that this point satisfies the predetermined aberration condition, such a difficulty does not occur.

Therefore, the procedure is arranged as follows: upon preparing a tool for facilitating assemblage and adjustment to have an image sensor, first, mounting the reference objective lens on the tool, capturing an image of the reference index with the image sensor, and storing the position of the reference index in the captured image; then replacing the reference objective lens with a desired optical system (in this case, an objective lens). In this situation, the mount level surface of the tool remains unchanged. Therefore, by adjusting the optical system (objective lens) so that a predetermined aberration condition is satisfied at a position that corresponds to the previously stored position of the reference index in the image, one can make a conjugate relationship between the position of the reference index of the reference objective lens and the position at which the predetermined aberration condition is satisfied in the adjusted objective lens. This conjugate relationship is maintained as long as the mount level surfaces of the reference objective lens and the adjusted objective lens remain unchanged, and thus is not affected by any optical member other than the objective lens (i..e. optical member that is not subject to adjustment). That is, if the objective lens is intended to be mounted on any optical system at user's site, the user can adjust the optical system, as long as the reference objective lens is mountable on this optical system, by first mounting the reference objective lens on the optical system, capturing with an image sensor an image of the reference index projected on the image surface and storing the position of the index, and then mounting the objective lens for practical use in place of the reference objective lens and adjusting the objective lens so that aberrations at a position corresponding to the position of the index that indicates a reference position in the stored image satisfy a predetermined condition.

The work only requires a time to replace the reference objective lens with the objective lens for practical use, and thus can be done easily.

As set forth above, it is preferred that the reference objective lens according to the present invention and an objective lens composed only of a lens system form a combination of objective lenses, wherein the objective lens composed of the lens system alone is functionally associated with the reference objective lens so that aberrations at a position that corresponds to the position of the reference index of the reference objective lens satisfy a predetermined condition.

According to the present invention, since the reference index point and its conjugate point on the object surface of the objective lens form a set as it being ensured that the latter is functionally associated with the former, a user can always recognize the functionally associated point. Also, even in the case where the objective lens is combined with another optical system, the functionally associated point can be easily recognized.

Also, if the objective lens to be combined with the reference objective lens is adjusted in accordance with the adjustment method of the present invention, a certain condition is assured for the objective lens as adjusted, and thus reliability to the quality is much improved.

Furthermore, according to the present invention, a distance from the mount level surface of the reference objective lens to the index member is preferably shorter than the parfocalizing distance of the objective lens to be combined with the reference objective lens.

Where a user is to perform switching between the reference objective lens and the objective lens to be combined with the reference objective lens, actual apparatuses often are configured to accomplish the switching via an electric mechanism and the like. During the switching operation, focus adjustment on the specimen in compliance with a newly selected objective lens also is to be performed via an electric mechanism and the like. In this situation, if the distance from the mount level surface of the reference objective lens to the reference index is longer than the parfocalizing distance of the objective lens to be combined with the reference objective lens, erroneous switching to the reference objective lens without withdrawal of the specimen would possibly cause the reference objective lens to collide with and break the specimen. In the case of manual operation, the user could notice the misoperation before the objective lens collides with the specimen, to stop the operation. However, in the case of electric operation, it often occurs that the objective lens has already collided with the specimen when the user notices the misoperation. Therefore, if the distance from the mount level surface of the reference objective lens to the index member is configured to be shorter than the parfocalizing distance of the objective lens to be combined with the reference objective lens, breakage of the specimen can be prevented.

Also, it is preferred that the focal length of the reference objective lens is configured to be equal to or longer than the focal length of the objective lens to be combined with the reference objective lens.

As described above, dividing a displacement $\Delta X1$ or $\Delta X2$ of the reference index on the specimen surface by the focal length f yields a value equivalent to the angle at which light emanating from the reference point on the index member emerges from the mount level surface of the objective lens. Here, if the angular error is supposed to be constant, the allowable amount of $\Delta X1$ or $\Delta X2$ is proportional to the focal length. That is, if the focal length f is doubled, $\Delta X1$ or $\Delta X2$ also is doubled. Similarly, if the focal length f is halved, $\Delta X1$ or $\Delta X2$ also is halved.

On the basis of this consideration, explanation is made why it is advantageous that the focal length of the reference objective lens is longer than the focal length of the objective lens to be combined with the reference objective lens.

Let us suppose that the reference objective lens involves a certain angular error. This angular error should be wholly inherited by the objective lens to be combined with the reference objective lens. In this situation, if the objective lens to be combined having the same angular error has a shorter focal length than the reference objective lens, the displacement as converted into a value on the specimen surface also is reduced at the same rate. Therefore, in the configuration where the focal length of the reference objective lens is longer than the focal length of the objective lens to be combined with the reference objective lens, even if a certain amount of angular error is left regarding the position of the reference point on the index of the reference objective lens, the displacement as converted into a value on the specimen surface under the condition where the objective lens to be combined with the reference objective lens is mounted in place can be smaller in accordance with the focal length ratio. Therefore, it is desirable that the focal length of the reference objective lens is configured to be longer than the focal length of the objective lens to be combined with the reference objective lens.

However, if so high a precision is not required, or in such a case where the magnification of the objective lens to be combined with the reference objective lens is small, the focal length of the reference objective lens is allowed to be equal to the focal length of the objective lens to be combined with the reference objective lens.

Furthermore, adjustment of an optical system provided with an imaging optical system and a relay optical system may be made using the reference objective lens according to the present invention.

To be specific, the adjustment is made according to the following steps: mounting on an apparatus having an image sensor the reference objective lens of the present invention together with an optical system provided with an imaging optical system and a relay optical system, capturing, with the image sensor, an image of the reference index formed by the reference objective lens, the imaging optical system and the relay optical system, calculating out a displacement between the center of the captured image and the position of the image of the reference index or a displacement between the center of the image pickup surface of the image sensor and the position of the image of the reference index and storing the position of the reference index, mounting on the apparatus having the image sensor the optical system having the imaging optical System and the relay optical system in place of the objective lens, measuring aberrations of the optical system, and adjusting at least one of the imaging optical system and the relay optical system on the basis of the measurement so that aberrations at a position that corresponds to the stored position satisfy a predetermined condition.

In this way, if based on the reference point on the index of the reference objective lens, adjustment of optical systems other than the objective lens to be combined with the reference objective lens can be made, also. For example, if a user adjusts the imaging optical system or the relay optical system so that the reference point on the index of the reference objective lens is positioned at the field center on the image surface, it is possible to much improve the performance of the optical system as a whole.

The embodiments of the present invention are described below in reference to the drawings.

First Embodiment

Figure 2:
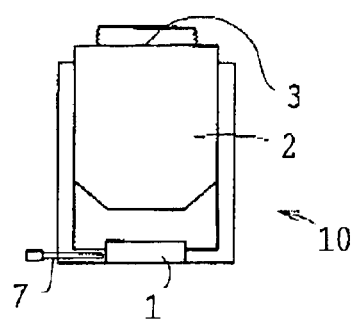
FIG. 2 is a schematic configuration view of a reference objective lens according to the first embodiment of the present invention.

As shown in FIG. 2, in a reference objective lens 10 according to the present invention, an index member 1 is fixed at the front-side focal position of an objective lens 2. The index member 1 is provided with a reference index formed with a pattern, which may be variously shaped as shown in FIGS. 3A–3C.

On the side face of the index member 1, adjustment pins 7 are provided to extend at least in three directions (In FIG. 2, only one adjustment pin 7 is shown for convenience). This structure allows a user to set the index member 1 in a desired position by operating the adjustment pins 7 via a screw to push and move the index member 1 in a front-side focal plane of the objective lens 2.

The index member 1 is constructed of a plane parallel plate, a surface of which may carry a dot-like mark as the reference index as shown in FIG. 3A, a reticule as shown in FIG. 3B, or engraved grid lines as shown in FIG. 3C. If the index is formed with grid lines, the position of the reference point as a target can be read as a coordinate. In this case, another index that indicates a position different from the reference position can be set using the grid lines.

Also, the index member 1 may be designed for transmission illumination to have an index painted on a transparent member such as a glass base plate or for reflecting illumination to have an index painted on a metal surface, a surface of a mirror member or the like.

Second Embodiment

FIG. 4 are explanatory views that show a combination of objective lenses according to the second embodiment of the present invention. FIG. 4A shows an objective lens to be combined with a reference objective lens, and FIG. 4B shows the reference objective lens.

The objective lens 11 to be combined with the reference objective lens of the present invention is configured as a normal type objective lens having only a lens system without an index member. The lens has a magnification of 100× and a focal length of 1.8 mm. Also, it has a parfocalizing distance of 45 mm.

The reference objective lens 10 is configured similar to that shown in the first embodiment. The lens has a magnification of 10× and a focal length of 18 mm. A distance from the mount level surface to the index member 1 is approximately 40 mm.

Also, the reference objective lens 10 is constructed to be shorter than the objective lens 11 Therefore, in the combination of objective lenses according to this embodiment, even if switching from the objective lens 11 to the reference objective lens 10 is erroneously made while the specimen remains at the best focus position under the objective lens 11, the objective lens 10 does not collide with the specimen.

Also, as the reference index of the index member 1 mounted on the reference objective lens 10, a reticule-type one as shown in FIG. 3B is employed. In this case, positioning accuracy of the cross point of the reticule is as much as 10 $\mu$m on the ten-times magnified image surface.

According to this embodiment, since the accuracy is 10 $\mu$m on the image surface, the accuracy $\Delta X1$ (or $\Delta X2$) on the index is 1 $\mu$m or 0.001 mm. Since the focal length f is 18 mm and 0.001 divided by 18 approximately is 0.00006, Condition (1) (or Condition (2)) is satisfied.

Since, as described above, the objective lens 11 to be combined with the reference objective lens has the focal length of 1.8 mm, which is one-tenth of the focal length of the reference objective lens 10, positioning accuracy for the functionally associated point on the specimen surface of the objective lens 11 to be combined with the reference objective lens is one-tenth of 1 $\mu$m, namely 100 nm. Positioning of a functionally associated point (e.g. a point at which generation of aberrations is smallest) with the accuracy as much as 10 nm would enable a user to conduct measurement fully exploiting the performance of the objective lens 11 to be combined with the reference objective lens, where it is taken into account that a line width of the order of submicrometers should be measured in the vicinity of this functionally associated point.

Third Embodiment

Figure 5:
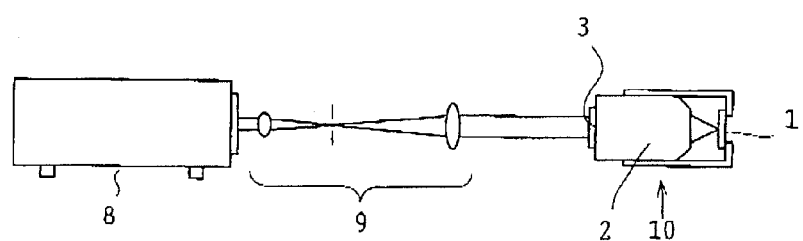
FIG. 5 is an explanatory view that shows a configuration used for positional adjustment of an index member to be mounted on a reference objective lens according to the third embodiment of the present invention.

FIG. 5 is an explanatory view that shows a configuration used for positional adjustment of an index member to be mounted on a reference objective lens according to the third embodiment of the present invention.

According to this embodiment, light emitted from a laser light source unit 8 is converted into an expanded beam of parallel rays via a beam expander optical system 9, and then the beam of parallel rays is incident perpendicular to a mount level surface 3 of the reference objective lens 10.

The reference objective lens 10 is configured similar to that shown in the first embodiment.

The position of the index member 1 is adjusted so that, using the configuration of this embodiment, the cross point of a reticule as shown in FIG. 3B or the like comes to a position on the index member 1 on which position the light incident perpendicular to the mount level surface 3 of the reference objective lens 10 converges.

Fourth Embodiment

Figure 6:
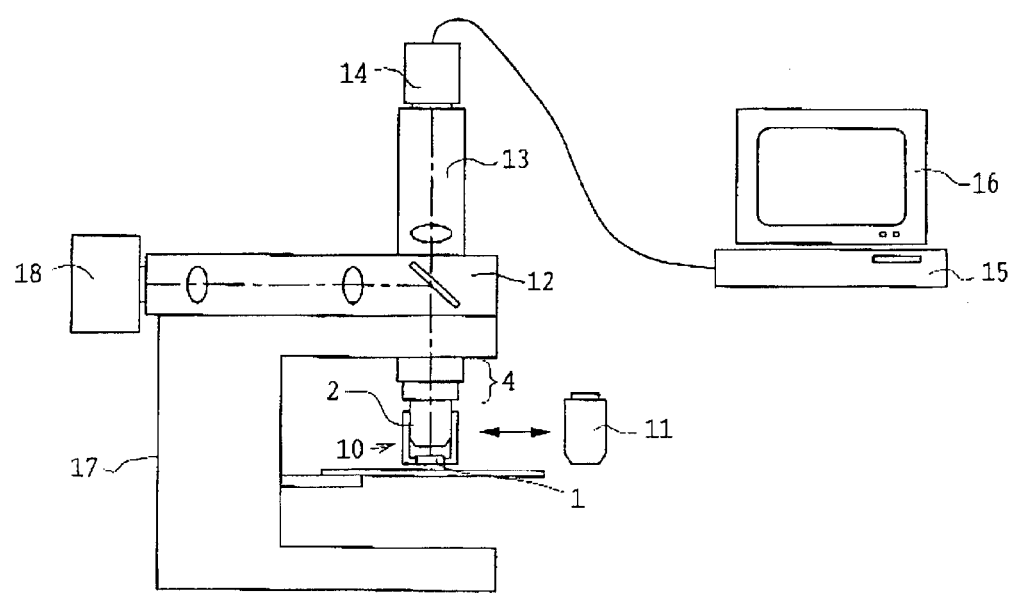
FIG. 6 is an explanatory view that shows a configuration of an apparatus applied to a method for adjusting an optical system using a reference objective lens according to the forth embodiment of the present invention.

FIG. 6 is an explanatory view that shows a configuration of an apparatus applied to a method for adjusting an optical system using a reference objective lens according to the fourth embodiment.

In the apparatus of this embodiment, light emitted from a white-light source lamp unit 18 is introduced to a reference objective lens 10 via a light projecting tube 12. Light reflected at an index member 1 of the reference objective lens 10 projects an image of the index on an image pickup surface of a CCD 14 via the reference objective lens 10 and an imaging lens unit 13. Then, the image captured with the CCD 14 is taken in by a personal computer (PC) 15 to be displayed on a monitor 16. In the drawing, the reference numeral 17 denotes a microscope body.

The reference objective lens 10 is mounted on a high-accuracy turn structure member 4, which is configured to turn the reference objective lens 10 around an axis perpendicular to a mount level surface 3 of the reference objective lens 10 without tilting the mount level surface 3.

Also, when the reference objective lens 10 is turned by the high-accuracy turn structure member 4, the center of a circle drawn by the image of the reference index (e.g. the cross point of a reticule) as captured with the CCD 14 is calculated out by the PC 15 and its position is stored. Then, the position of the reference index 1 of the reference objective lens 10 can be adjusted so that the cross point of the reticule, for example, is moved to the stored position.

According to this embodiment, if an objective lens constituting the reference objective lens 10 has a magnification of 10×, the positioning accuracy for the cross point of the reticule is as much as 10 $\mu$m.

According to the adjustment method described in this embodiment, the combination of objective lenses as set forth in the second embodiment, for example, can be reduced into realization by first adjusting the position of the index of the reference objective lens 10 and then mounting the objective lens 11 to be combined with the reference objective lens 10 in place of the reference objective lens 10 and tuning the performance so that a position that corresponds to the position stored in the PC 15 satisfies a predetermined aberration condition.

Also, according to this embodiment, when the reference objective lens 10 is turned via the high-accuracy turn structure member 4, the image of the reference index (e.g. the cross point of a reticule) captured by the CCD 14 is stored via the PC 15. However, in the case where somewhat lower accuracy is allowable, storage may be made by directly marking this position on the monitor 16 with a pen or the like.

Fifth Embodiment

Figure 7:
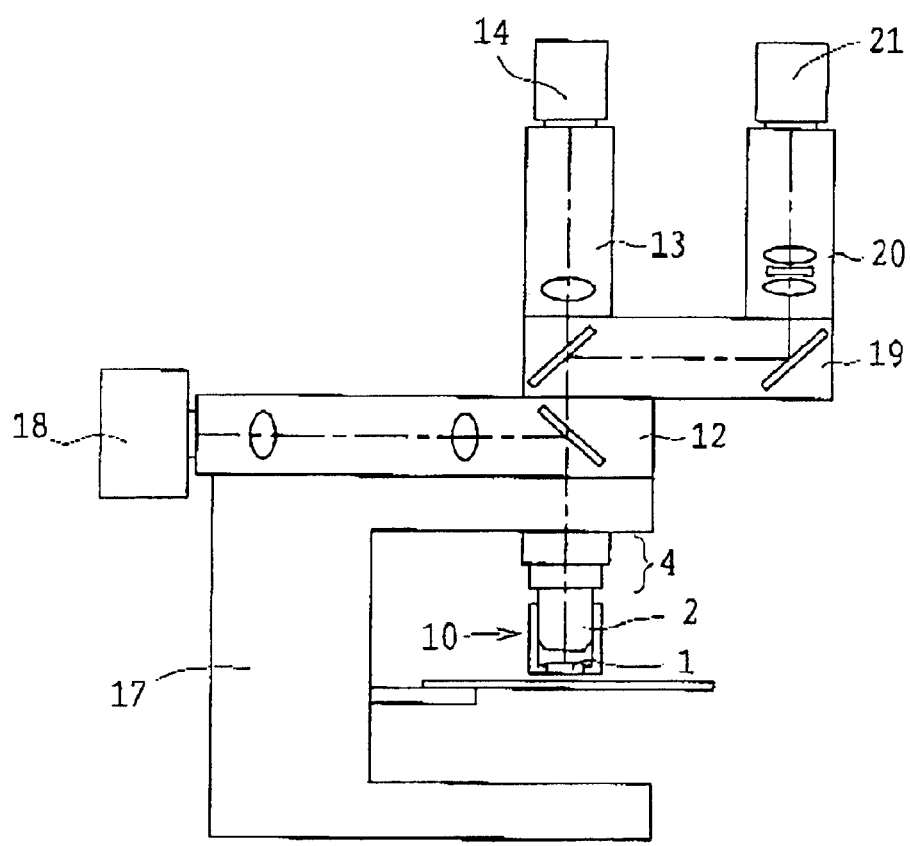
FIG. 7 is an explanatory view that shows a configuration of an optical system using a reference objective lens according to the fifth embodiment of the present invention.

FIG. 7 is an explanatory view that shows a configuration of an optical system using a reference objective lens according to the fifth embodiment.

In this embodiment, light emitted from a white-light source lamp unit 18 is introduced to a reference objective lens 10 via a light projecting tube 12. Light reflected at an index member 1 of the reference objective lens 10 projects an image of the reference index on an image pickup surface of a CCD 14 via the reference objective lens 10 and an imaging lens unit 13. Also, a path branching unit 19 is provided between the light projecting tube 12 and the imaging lens unit 13. In a branched-off path different from the path in which the imaging lens unit 13 is disposed, an imaging lens unit 20 having a focal length different from the imaging lens unit 13 is arranged, so that another image of the index can be captured via a CCD 21.

Regarding the reference objective lens 10 used in this embodiment, positional adjustment of the reference index is made according to the adjustment method set forth in the third embodiment or the fourth embodiment. In addition, the imaging lens unit 13 or an imaging lens in the imaging lens unit 13 is adjusted so that an image of the reference index (e.g. the cross point of a reticule) of the reference objective lens 10 is positioned at the center of the captured image by the CCD 14. Similarly, the imaging lens unit 20 or an imaging lens in the imaging lens unit 20 or a mirror in the path branching unit 19 is adjusted so that an image of the reference index (e.g. the cross point of a reticule) of the reference objective lens 10 is positioned at the capture center of the CCD 21.

According to the present invention, images of the specimen can be projected at different magnifications. Irrespective of whichever image is used for measurement, the center of the captured image is functionally characterized and thus the measurement can be performed under the ideal condition According to this embodiment, light emergent from the reference objective lens 10 is imaged only by the imaging lens. However, a relay lens may be included between the objective lens 10 and the imaging lens, as a matter of course.

What is claimed is:

1. A combination of objective lenses at least comprising:
   a first objective lens; and
   a second objective lens,
   wherein said first objective lens is composed of a lens system alone, said second objective lens comprises a lens system and an index member provided with an index that indicates a reference position, said index member is disposed on a front-side focal position of said lens system of said second objective lens or in a vicinity thereof, and said first objective lens is adjusted so that aberrations at a position that corresponds to a position of said index that indicates the reference position in said second objective lens satisfy a predetermined condition.

2. A combination of objective lenses according to claim 1, wherein said first objective lens is adjusted by a method comprising the steps of:
   mounting said second objective lens on an apparatus for adjustment having an image sensor, and capturing an image of said index with said image sensor;
   calculating out a position of said index in the captured image and storing said position of said index;
   replacing said second objective lens with said first objective lens and performing measurement of aberrations of said first objective lens; and
   adjusting said first objective lens so that aberrations at a position that corresponds to a stored position calculated out on a basis of the measurement satisfy a predetermined condition.

3. A combination of objective lenses according to claim 2, wherein said second objective lens has a mount level surface, a distance from which to said index member is shorter than a parfocalizing distance of said first objective lens.

4. A combination of objective lenses according to claim 3, wherein a focal length of said second objective lens is equal to or longer than a focal length of said first objective lens.

5. A combination of objective lenses according to claim 2, wherein a focal length of said second objective lens is equal to or longer than a focal length said first objective lens.

6. A combination of objective lenses according to claim 1, wherein said second objective lens has a mount level surface, a distance from which to said index member is shorter than a parfocalizing distance of said first objective lens.

7. A combination of objective lenses according to claim 1, wherein a focal length of said second objective lens is equal to or longer than a focal length said first objective lens.

8. A method for adjusting an optical system, comprising the steps of:
   mounting on an apparatus having an image sensor an objective lens that has a lens system and an index member provided with an index that indicates a reference position and capturing an image of said index that indicates the reference position with said image sensor, said index member being disposed on a front-side focal position of said lens system or in a vicinity thereof;
   calculating out a position of said index that indicates the reference position in a captured image and storing said position of said index;
   mounting a predetermined optical system in place of said objective lens on said apparatus having said image sensor and measuring aberrations of said optical system; and
   adjusting said optical system so that aberrations at a position that corresponds to the stored position satisfy a predetermined condition.

9. A method for adjusting an optical system according to claim 8, wherein said optical system is another objective lens that is different from said objective lens having said index member.

10. A method for adjusting an optical system that is provided with an imaging optical system and a relay optical system, using an objective lens that comprises a lens system and an index member provided with an index that indicates a reference position, said index member being disposed on a front-side focal position of said lens system or in a vicinity thereof, the method comprising the steps of:
    capturing, with an image sensor, an image of said index that indicates the reference position formed by said objective lens, said imaging optical system and said relay optical system;
    calculating out a displacement between a center of a captured image and an image position of the said index that indicates the reference position or a displacement between a center of an image pickup surface of said image sensor and the image position of said index that indicates the reference position; and
    adjusting at least one of said imaging optical system and said relay optical system on a basis of said displacement.

11. An objective lens comprising:
    a lens system; and
    an index member provided with an index that indicates a reference position, said index member being disposed on a front-side focal position of said lens system or in a vicinity thereof,
    wherein said objective lens has a mount level surface, and said index member is positioned in reference to said mount level surface so that a point on which a beam of parallel rays incident perpendicular to said mount level surface converges coincides with a position of said index that indicates a reference position.

12. An objective lens comprising:
    a lens system; and
    an index member provided with an index that indicates a reference position, said index member being disposed on a front-side focal position of said lens system or in a vicinity thereof, wherein said objective lens has a mount level surface, and said index member is positioned so that, while said objective lens is turned around an axis that is perpendicular to said mount level surface, an image of said index that indicates the reference position formed via said objective lens constantly stays at a same position.

13. An objective lens comprising:

a lens system; and an index member provided with an index that indicates a reference position, said index member being disposed on a front-side focal position of said lens system or in a vicinity thereof, wherein said objective lens has a mount level surface and satisfies the following condition:

$$\Delta X1/f \leq 0.001$$

where $\Delta X1$ is a displacement between a position on which a beam of parallel rays incident perpendicular to said mount level surface converges and a position of said index that indicates the reference position, and $f$ is a focal length of said lens system.

14. An objective lens comprising:

a lens system; and an index member provided with an index that indicates a reference position, said index member being disposed on a front-side focal position of said lens system or in a vicinity thereof, wherein said objective lens has a mount level surface and satisfies the following condition:

$$\Delta X2/f \leq 0.001$$

where $\Delta X2$ is a radius of a circle drawn by said index that indicates the reference position while said objective lens is turned around an axis perpendicular to said mount level surface, and $f$ is a focal length of said lens system.

15. An objective lens comprising:

a lens system; and an index member provided with an index that indicates a reference position, said index member being disposed on a front-side focal position of said lens system or in a vicinity thereof, wherein said index member at least has said index that indicates the reference position and another index that indicates a position different from the reference position, and wherein said objective lens has a mount level surface, and said index member is positioned in reference to said mount level surface so that a point on which a beam of parallel rays incident perpendicular to said mount level surface converges coincides with a position of said index that indicates a the reference position.

16. An objective lens comprising:

a lens system; and an index member provided with an index that indicates a reference position, said index member being disposed on a front-side focal position of said lens system or in a vicinity thereof, wherein said index member at least has said index that indicates the reference position and another index that indicates a position different from the reference position, and wherein said objective lens has a mount level surface, and said index member is positioned so that, while said objective lens is turned around an axis that is perpendicular to said mount level surface, an image of said index that indicates the reference position formed via said objective lens constantly stays at a same position.

17. An objective lens comprising:

a lens system; and an index member provided with an index that indicates a reference position, said index member being disposed on a front-side focal position of said lens system or in a vicinity thereof, wherein said index member at least has said index that indicates the reference position and another index that indicates a position different from the reference position, and wherein said objective lens has a mount level surface and satisfies the following condition:

$$\Delta X1/f \leq 0.001$$

where $\Delta X1$ is a displacement between a position on which a beam of parallel rays incident perpendicular to said mount level surface converges and a position of said index that indicates the reference position, and $f$ is a focal length of said lens system.

18. An objective lens 4 comprising:

a lens system; and an index member provided with an index that indicates a reference position, said index member being disposed on a front-side focal position of said lens system or in a vicinity thereof, wherein said index member at least has said index that indicates the reference position and another index that indicates a position different from the reference position; and wherein said objective lens has a mount level surface and satisfies the following condition:

$$\Delta X2/f \leq 0.001$$

where $\Delta X2$ is a radius of a circle drawn by said index that indicates the reference position while said objective lens is turned around an axis perpendicular to said mount level surface, and $f$ is a focal length of said lens system.

* * * * *